United States Patent [19]
Imafuji et al.

[11] Patent Number: 6,049,676
[45] Date of Patent: Apr. 11, 2000

[54] MOTION COMPENSATION DEVICE FOR A CAMERA SYSTEM

[75] Inventors: Kazuharu Imafuji, Kawasaki; Nobuhiko Terui, Ichikawa, both of Japan

[73] Assignee: Nikon Corporation, Tokyo, Japan

[21] Appl. No.: 08/538,809

[22] Filed: Oct. 3, 1995

[30] Foreign Application Priority Data

Oct. 3, 1994 [JP] Japan ................................. 6-239143

[51] Int. Cl.[7] .................................................. G03B 5/00
[52] U.S. Cl. ................................................ 396/53; 396/55
[58] Field of Search ................... 354/430, 202; 348/208; 359/554; 396/52–55

[56] References Cited

U.S. PATENT DOCUMENTS 5,220,375  6/1993  Ishida et al. ................. 354/430 X
5,539,496  7/1996  Wakabayashi et al. .............. 354/430

*Primary Examiner*—W. B. Perkey

[57] ABSTRACT

A motion compensation system for a camera including a detachable lens barrel and a camera body. The motion compensation system identifies whether the detection of motion compensation is possible within the camera body. In response to a lens status command to the lens barrel from camera body, the lens barrel transmits to the camera body data indicating whether the detection of motion by a motion sensor or a sensor circuit is possible. Upon receiving the data, the camera body identifies whether the detection of motion is possible.

16 Claims, 6 Drawing Sheets

| BIT | DESCRIPTION | OUTPUT DATA |
|---|---|---|
| 7 | YAWING DETECTION | 1: DETECTION OK <br> 0: DETECTION NG |
| 6 | PITCHING DETECTION | 1: DETECTION OK <br> 0: DETECTION NG |
| 5 | – | |
| 4 | – | |
| 3 | – | |
| 2 | – | |
| 1 | – | |
| 0 | – | |

FIG. 6

MOTION COMPENSATION DEVICE FOR A CAMERA SYSTEM

BACKGROUND OF THE INVENTION

1. Field of the Invention

The present invention relates to a motion compensation device that detects motion caused by motions, induced by, for example, camera motion, and compensates for the motion to prevent image blur on an image forming plane, and, more particularly, to a camera system, including a camera body, and a lens barrel equipped with a motion compensation device.

2. Description of the Related Art

In recent years, electronification of various components of a camera, including automatic exposure and auto focus functions, has produced highly automated camera systems. With such camera systems, attempts have been made to automate an anti-motion function (also known as a motion compensation function) that compensates for image blur caused by camera motion during hand held photographic operation. Image blur suppression devices have as their object, suppression of, or reduction of, blurring in an image projected onto an image plane. A motion compensation device is a type of image blur suppression device which compensates for motion incident upon an optical system which projects the image onto the image plane. Motion is typically imparted to the optical system by way of vibrations in the optical system, or in the surrounding holding member. In general, known motion compensation devices cause a compensation lens to shift counter to the motion of the optical system so as to shift the image projected by the optical system relative to the optical system.

Generally, known motion compensation devices for cameras comprise a motion detection unit that detects motions based on the camera's angular velocity or acceleration, a motion compensation optical system, provided within a lens barrel attached to the camera, movable over a plane perpendicular to the optical axis of the main optical system, a computation unit, such as a microcomputer, that computes a compensating value (including, for example, direction and velocity), to correct a photographic optical axis, based on output provided by the motion detection unit, and a drive unit, including an electric motor, etc., to move the motion compensation optical system vertically and horizontally based on the computation results from the computation unit.

Image blur is compensated for by shifting the motion compensation optical system over the plane perpendicular to the optical axis of the main optical system during a motion compensation sequence. Other representative methods of motion compensation used in cameras are, for example, the gimbal method and the variable angle prism method wherein a liquid is placed between two glass plates, and the angle formed by these two glass plates is adjusted. In general, the camera body controls a photographic operation by obtaining data, such as a focal length of the lens and an aperture value, along with status data, such as whether the focal point detection is in automatic or manual mode, and the movement status of the movable lens, obtained from the lens barrel.

Communication between the camera body and the lens barrel is achieved by sending and receiving serial communication signals between microcomputers, one on the camera body side and another on the lens barrel side. The signals are transmitted via contact points that makes contact when the camera body and the lens barrel are assembled together.

However, in known motion compensation devices a possibility exists that when the camera body instructs the lens barrel to initiate motion compensation control, even if motion detection was impossible because, for example, a power supply was inadvertently shut off to either a motion sensor or to a motion detection system circuit provided within the lens barrel. Moreover, even if power is resupplied to the motion sensor and the motion detection unit, there is the possibility that the camera body might initiate a motion compensation sequence without stabilizing the output of the motion detection system circuit, i.e. before initialization of the motion detection system circuit. In such an event is impossible to determine whether a sufficiently stable output can be generated.

SUMMARY OF THE INVENTION

Accordingly, it is an object of the present invention to provide a motion compensation device that can identify whether motion compensation is possible.

It is also an object of the present invention to provide a motion compensation device for a camera system that can identify whether motion compensation is possible.

It is a further object of the present invention to provide a motion compensation device for a camera body that can identify whether motion compensation is possible.

It is an additional object of the present invention to provide a motion compensation device for a lens barrel that can identify whether motion compensation is possible.

Additional objects and advantages of the invention will be set forth in part in the description which follows, and, in part, will be obvious from the description, or may be learned by practice of the invention.

The above objects of the present invention are achieved in a motion compensation device comprising a motion detection unit to detect image blur causing motions, a motion compensation unit that compensates for image blur on an image forming plane, a motion compensation drive unit that drives the compensation unit based on the output from the motion detection unit, a motion detection status determination unit that determines whether the motion detection unit is able to detect the motions, a motion compensation initiation command unit that initiates a motion compensation sequence when the motion detection status determination unit determines that motions are detectable.

Objects of the present invention are also achieved in a camera system comprising a detachable lens barrel having a motion detection unit that detects motions in the camera motion, a motion compensation unit that compensates for image blur on an image forming plane caused by the motions, and a motion compensation drive unit that drives the motion compensation unit based on the output from the motion detection unit, a camera body that can communicate with the lens barrel, a motion detection status determination unit which determines whether the motion detection unit is able to detect motions, a motion compensation initiation command unit which provides instructions to initiate motion compensation sequence when a determination is made that the motion detection status determination unit is able to detect motions, and signals indicating that the motion detection unit is in a state to detect the motion are transmitted from the lens barrel to the camera body.

Objects of the present invention are achieved in a camera body equipped with a motion compensation device having a motion detection unit that detects motions generated by camera motion, a compensation unit that compensates for image blur, due to the motions, on an image forming plane, and a motion compensation drive unit that drives the compensation unit based on the output from the motion detection unit, a lens barrel provided with a motion detection status determination unit that determines whether the motion detection unit is in a state to detect the motions, the lens barrel is detachably fixed to a camera body, and a motion compensation initiation command unit providing instructions for the initiation of a motion compensation sequence when the motion detection unit is in a state to detect the motion from the lens barrel.

Objects of the present invention are also achieved in a lens barrel, detachably fixed to a camera body, that has a motion detection unit for detecting motions generated by camera motion, a compensation unit that compensates for image blur on an image forming plane caused by the motions, a motion compensation drive unit that drives the compensation unit, a motion detection status determination that determines whether the motion detection unit is in a state to detect the motion and the signals and output a signal to the camera body.

Objects of the present invention are also achieved in a motion compensation device for an optical system comprising a motion detection unit that detects motion which will cause image blur on an image produced by the optical system, a compensation unit that compensates for the motion detected by the motion detection unit, a motion compensation optical system that alters an optical axis of the optical system to compensate for the motion, a motion compensation drive unit that drives the compensation unit based on the output from the motion detection unit, a motion detection status determination unit that determines whether the motion detection unit is able to detect the motion, and a motion compensation initiation command unit that provides instructions to initiate a motion compensation sequence when the motion detection status determination unit determines that the motion detection unit is able to detect the motion.

Objects of the present invention are also achieved in a camera system comprising a lens barrel having a motion detection unit that detects motion a compensation unit that compensates for the image blur caused by the motion, and a motion compensation drive unit that drives the compensation unit based on the output from the motion detection unit, a motion detection status determination unit that determines whether the motion detection unit is able to detect the motion a camera body attached to the lens barrel, the camera body adapted to communicate with the lens barrel, and a motion compensation initiation command unit that provides instructions to initiate a motion compensation sequence when the motion detection status determination unit transmits a signal indicating that the motion detection unit is able to detect the motion.

Objects of the present invention are also achieved in a camera system comprising a camera body having a motion detection unit that detects camera motion, a compensation unit that compensates for image blur caused by the camera motion, and a motion compensation drive unit that drives the compensation unit based on the output from the motion detection unit, a lens barrel attached to the camera body having a motion detection status determination unit adapted to send a signal to the camera body indicating whether the motion detection unit is able to detect the motion, and the camera body having a motion compensation initiation command unit that instructs the initiation of a motion compensation sequence upon receiving a signal from the lens barrel indicating that the motion detection unit is able to detect the motion.

Objects of the present invention are also achieved in a lens barrel for use with a camera body, the lens barrel comprising a motion detection unit that detects motion generated by camera motion, a compensation unit that compensates for image blur caused by the camera motion, a motion compensation drive unit that drives the compensation unit based on the output from the motion detection unit, and a motion detection status determination unit that indicates to the camera body whether the motion unit is able to detect the motion.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 6 is a diagram showing the data that corresponds to motion detection data transmitted to a lens barrel by a camera body of the camera system in accordance with the preferred embodiment of the present invention.

DESCRIPTION OF THE PREFERRED EMBODIMENT

Figure 1:
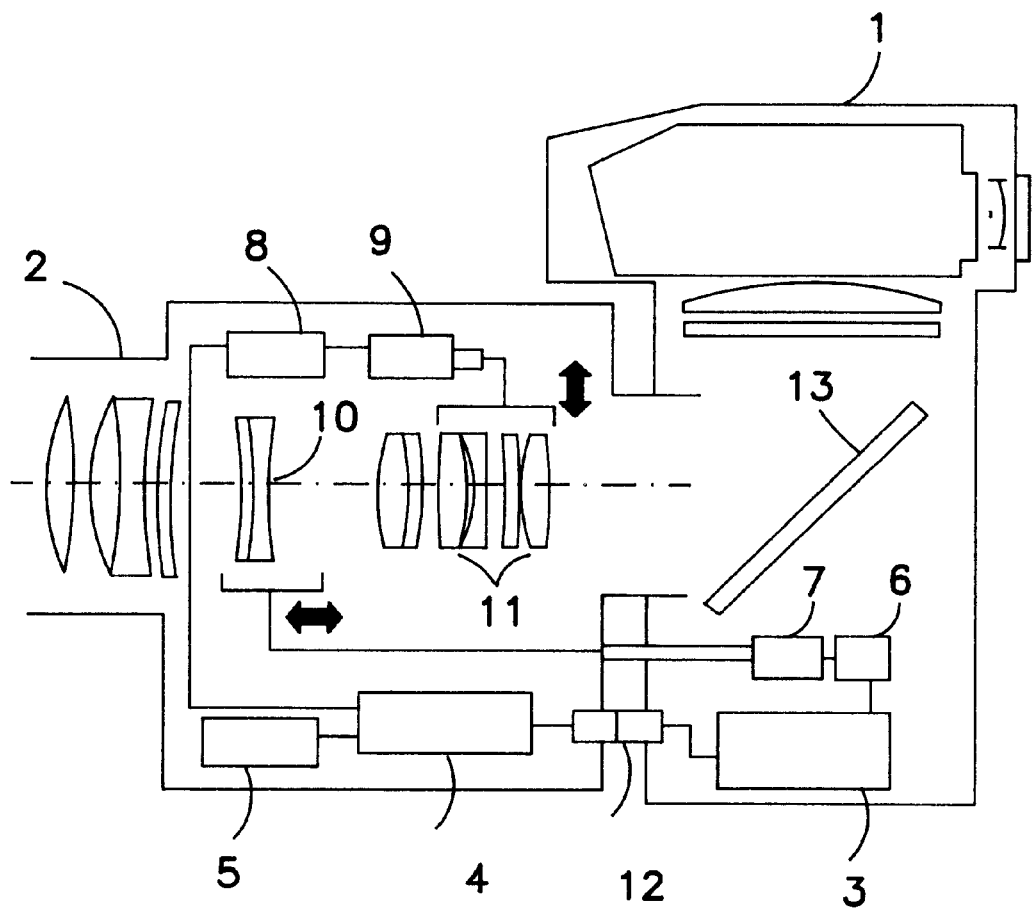
FIG. 1 is a cross-sectional view of a camera system equipped with a motion compensation device in accordance with a preferred embodiment of the present invention.

Reference will now be made in detail to the present preferred embodiments of the present invention, examples of which are illustrated in the accompanying drawings, wherein like reference numerals refer to like elements throughout.

Figure 2:
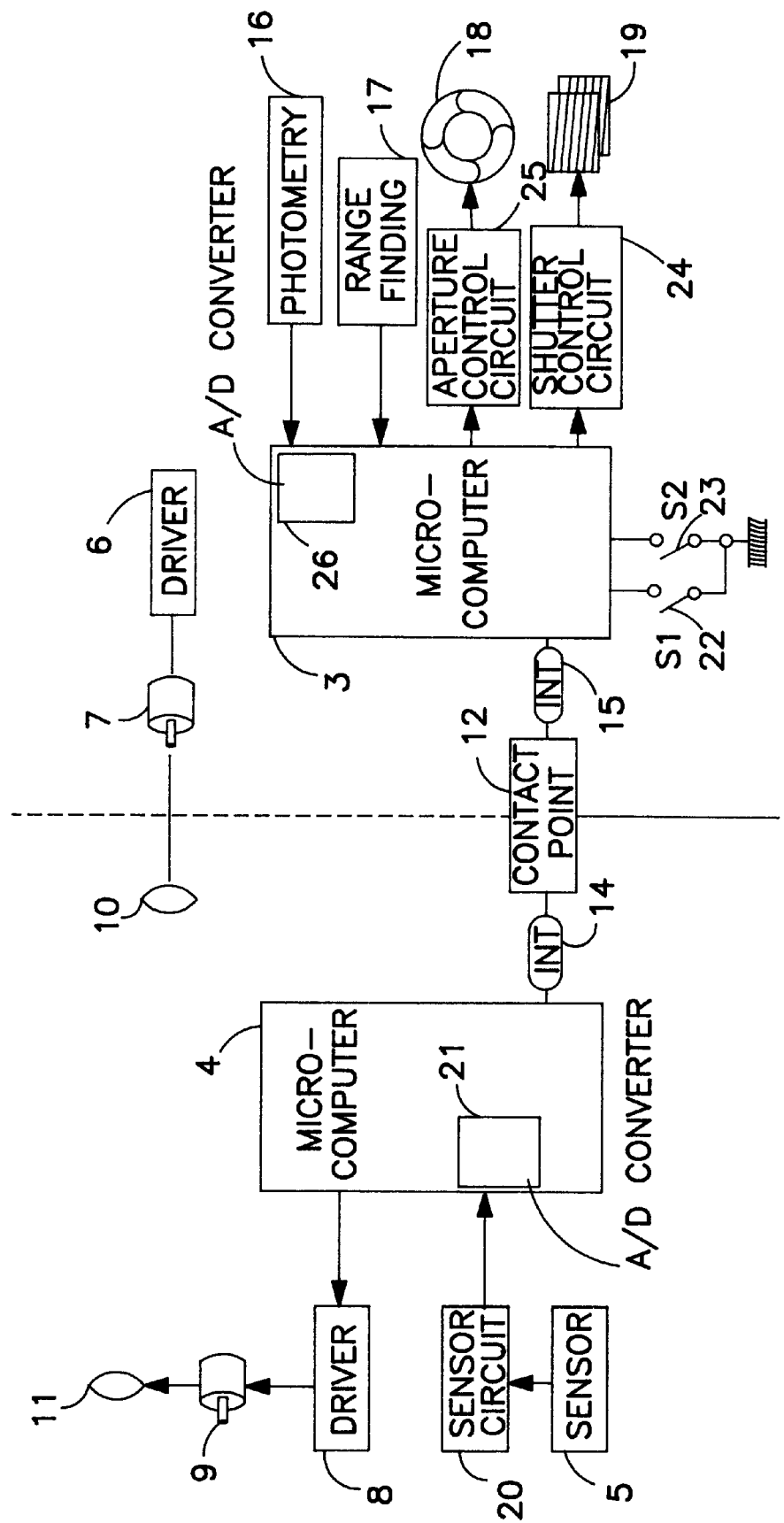
FIG. 2 is a block diagram of a camera system equipped with the motion compensation device in accordance with the preferred embodiment of the present invention.

FIG. 1 is a cross-sectional view of a camera system, specifically a single lens reflex camera, equipped with a motion compensation device in accordance with a preferred embodiment of the present invention. FIG. 2 is a block diagram of a camera system equipped with the motion compensation device in accordance with the preferred embodiment of the present invention.

The camera system in accordance with the preferred embodiment generally comprises a camera body 1, and a lens barrel 2. The lens barrel 2 is detachably fixed to the camera body 1.

In the camera body 1, a microcomputer 3 is provided to control the photographic operation of the camera system. The microcomputer 3 is provided with an A/D converter 26 that converts analog signals to digital signals. A photometry unit 16, a range finding unit 17, a half push switch (S1) 22, and a full push switch (S2) 23, are connected to microcomputer 3. The photometric unit 16 detects brightness information regarding a photographic subject (not shown). Output signals of the photometric unit 16 are connected to the microcomputer 3 via the A/D converter 26. The range finding unit 17 gauges a distance to the photographic subject. The half push switch 22 is turned on by pressing a shutter release button (not shown) halfway. The full push switch 23 is turned on by fully pressing the shutter release button.

The microcomputer 3 is connected to an aperture 18 via an aperture control circuit 25. The microcomputer 3 is also connected to a shutter 19 via a shutter control circuit 24. The shutter control circuit 24 conducts drive control of a front and rear shutter blinds of the shutter 19. The aperture control circuit 25 provides drive control for closing and opening the aperture 18. The microcomputer 3 is further connected to an AF lens drive motor 7 via a driver 6. The AF lens drive motor 7 drives an AF lens 10 in the lens barrel 2.

The lens barrel 2 is provided with a microcomputer 4 is installed in the lens barrel 2 for providing drive control to the lens barrel 2. The microcomputer 4 is provided with an A/D converter 21. An angular velocity sensor 5 is connected to the microcomputer 4 via a sensor circuit 20. The angular velocity sensor 5 detects the angular velocity of motions generated by movements in the camera system. The sensor circuit 20 filters a high frequency portion of the output from the angular velocity sensor 5 as well as amplifies the signals from the angular velocity sensor 5. The output of the sensor circuit 20 is connected to the A/D converter 21. The A/D converter 21 converts the analog signals from the sensor 20 into digital signals. Furthermore, the microcomputer 4 is connected to a motion compensation motor 9 via a driver 8. The motion compensation motor 9 drives a motion compensation lens 11. The motion compensation lens 11 is movable vertically and laterally, so as to correct for image blur on an image plane caused by motions of the camera system.

The microcomputer 3 and the microcomputer 4 send and receive signals via interfaces 14 (in the lens barrel 2) and 15 (in the camera body 1). The interfaces 14 and 15 contact at a contact point 12 when the lens barrel 2 is fixed to the camera body 1. The microcomputer 3 receives characteristic parameters and status data of the lens from the microcomputer 4. The microcomputer 4 receives signals regarding the status of camera body 1, as well as signals instructing the initiation and completion of a motion compensation sequence, from the microcomputer 3. Communications between the microcomputers 3 and 4 are executed using known serial communications methods.

Figure 3:
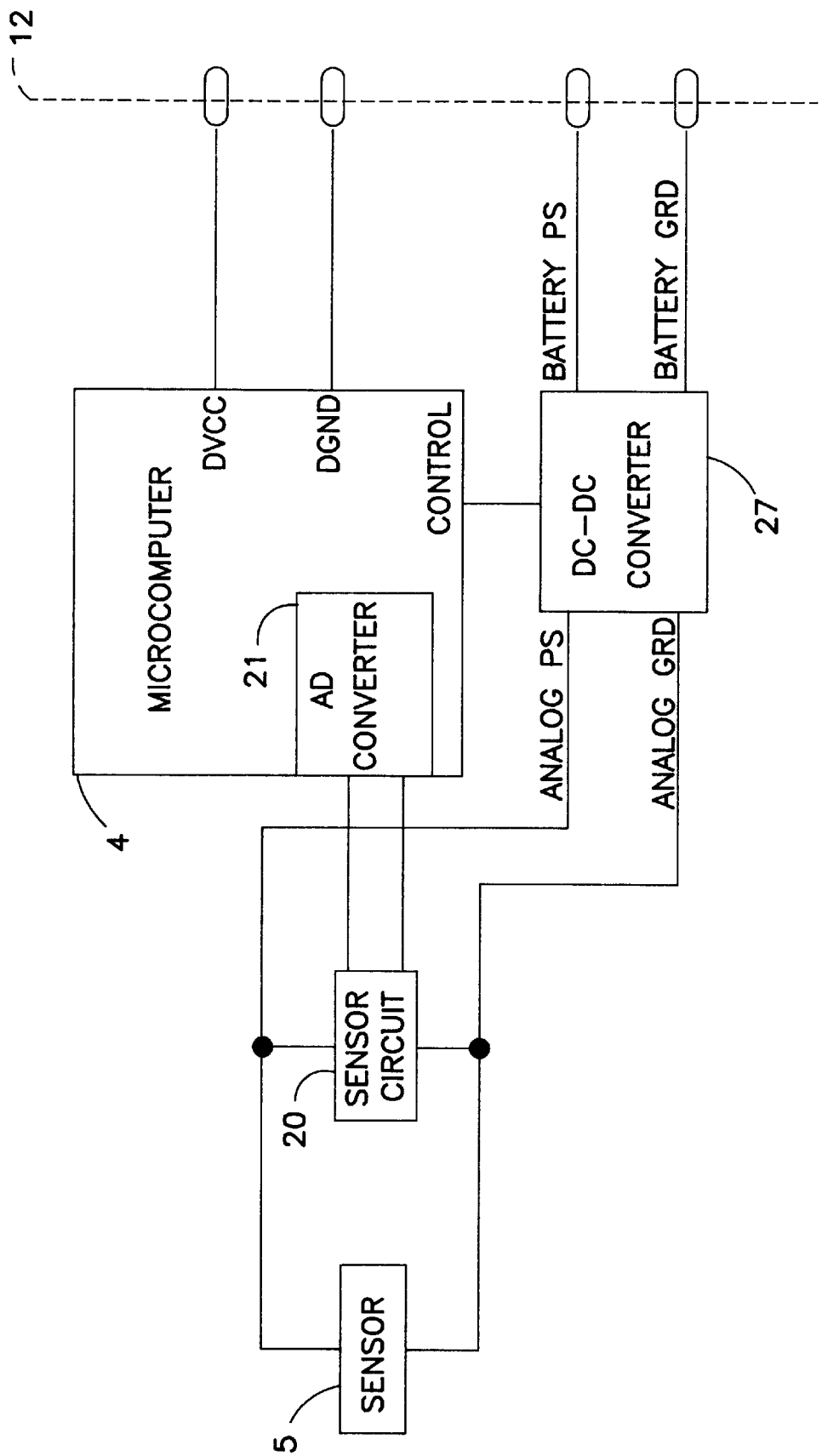
FIG. 3 is a block diagram of the motion compensation device in accordance with the preferred embodiment of the present invention.

FIG. 3 is a block diagram of a motion compensation device in accordance with the preferred embodiment of the present invention. In general the compensation device comprises the microcomputer 4, a DC—DC converter 27, the angular velocity sensor 5, the sensor circuit 20 and an associated power supply system. A digital power supply is provided by the camera body 1 via the contact point 12. The digital power supply supplies power to the microcomputer 4 and associated digital systems in the lens barrel 2.

An analog power supply is provided by the camera body 1 via the contact point 12. The analog power supply is connected to the DC—DC converter 27, which functions as an output terminal of a battery (not shown), installed in camera body 1, within lens barrel 2. The output from the DC—DC converter 27 supplies power to the various analog systems in the lens barrel 2, including the angular velocity sensor 5, the sensor circuit 20, etc.

A control terminal in the microcomputer 4 functions to turn the DC-DC converter 27 ON and OFF. The ON and OFF status of the DC—DC converter 27 is controlled by changing the output from control terminal from Hi to LOW. Thus, it is necessary that the analog power supply be provided from camera body 1 and that the output of DC-DC converter 27 be set for ON for the power supply to be provided to the angular velocity sensor 5 and the sensor circuit 20.

Detection of motions by the angular velocity sensor 5 is disabled when: a power supply is not provided from camera body 1 to either the digital or analog systems; the control terminal of the DC—DC converter 27 is turned OFF although the power is supplied from the camera body 1, thereby failing to provide the power supply to the angular velocity sensor 5 and the sensor circuit 20; the output of the angular velocity sensor 4 and the sensor circuit 20 is not fully powered, and therefore not stable, immediately after the power has been supplied to the angular velocity sensor 5 and the sensor circuit 20.

If the angular velocity sensor 5 and the sensor circuit 20 in the lens barrel 2 are disabled, the camera body I attempts to initiate a motion compensation sequence but the normal compensation sequence cannot be performed. Therefore, it necessary to identify whether the lens barrel 2 is in a state to detect the motion. Motion detection data indicating whether motion detection is possible is generated in the lens barrel 2. The camera body 1 sends a lens status command, to obtain the motion detection data, to lens barrel 2. In response the camera body 1 receives the motion detection data from the lens barrel 2.

FIG. 6 is a diagram showing the data that corresponds to motion detection data transmitted to a lens barrel by a camera body of the camera system in accordance with the preferred embodiment of the present invention. The motion detection data, preferably one byte in length, indicates whether the normal detection of motion by the angular velocity sensor 5 is possible. A bit 7 indicates whether the detection of the motion in the yawing direction is possible. A bit 6 indicates whether the detection of the motion in the pitching direction is possible. If the detection of motions is possible, power has been supplied, and the angular velocity sensor 5 and the sensor circuit 20 are fully powered up.

If the detection of motions is impossible, power is, inadvertently, not being supplied to the angular velocity sensor 5 and the sensor circuit 20, thereby disabling the detection of motions. Alternatively, the angular velocity sensor 5 and the sensor circuit 20 have not yet fully powered up, thereby failing to obtain a stable output. These situations may be caused when, for example, the remaining power of the battery is low, or the electrical load is too large.

Figure 4:
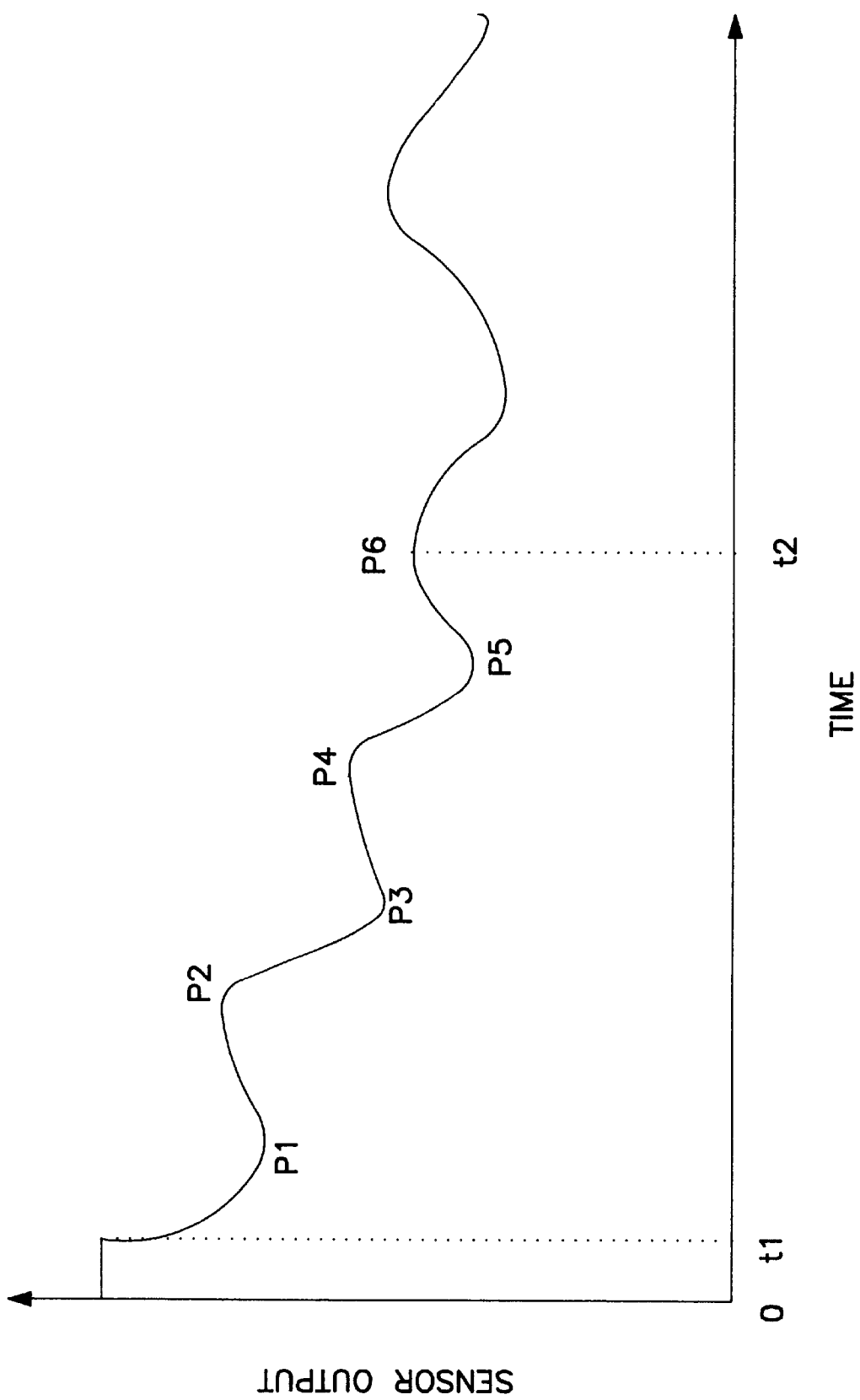
FIG. 4 is a line chart showing an output signal from a sensor circuit of the motion compensation device in accordance with the preferred embodiment of the present invention.

FIG. 4 is a line chart showing an output signal from a sensor circuit of the motion compensation device in accordance with the preferred embodiment of the present invention. Power is supplied to the angular velocity sensor 5 and the sensor circuit 20 at time 0. Initialization of the sensor circuit 20 is performed from time 0 to time t1. After initialization of the sensor circuit 20 is completed, the output of sensor circuit 20 becomes stable after time t2. The amount of time for the output of the sensor circuit 20 to become stable is determined by the characteristics of the angular velocity sensor 5, as well as characteristics of any OP amplifiers used in the sensor circuit 20. Further, drift delays affect the time required to achieve a stable output.

During a motion compensation sequence, adequate motion compensation control is not executed if control is initiated when the power has been supplied to the angular velocity sensor 5 and the sensor circuit 20, but a fully stabilized output has not been obtained (period prior to t2 in FIG. 4). On the other hand, adequate motion compensation control can be accomplished if power has been supplied to the angular velocity sensor 5 and the sensor circuit 20 and if the motion compensation control is performed while the sensor circuit 20 is in a state where the sensor circuit 20 can obtain fully stabilized output (after t2 in FIG. 4).

To identify when the sensor circuit 20 is fully stable, the microcomputer 4 detects peak values P1 through P6 of the output of the sensor circuit 20. The microcomputer determines if the output of the sensor circuit 20 is fully stable based on changes of the peak values. Alternatively, the microcomputer 4 can equalize the output of the sensor circuit 20 for a certain period of time to make a determination based on the changes in the mean values.

Figure 5:
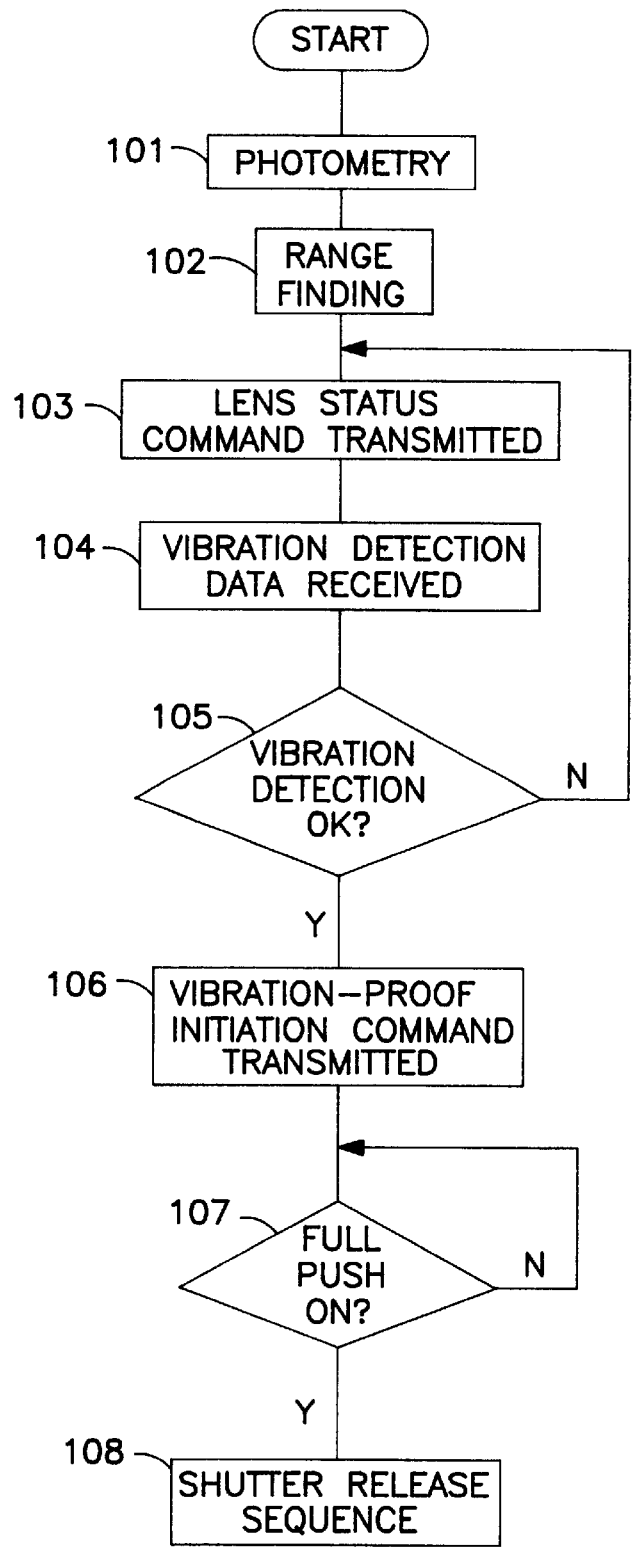
FIG. 5 is a flow chart showing the operation of the motion compensation device in accordance with the preferred embodiment of the present invention.

FIG. 5 is a flow chart showing the operation of the motion compensation device in accordance with the preferred embodiment of the present invention. The operation commences at START when the half push switch (S1) 22 is activated, by pressing the shutter release button halfway.

In step 101, the microcomputer 3 performs a photometric procedure in which the brightness of the photographic subject is measured by the photometric unit 16. In step 102, the microcomputer 3 performs a range finding procedure in which the distance to the subject measured by the range finding unit 17. In step 103, the microcomputer 3 transmits a lens status command to the lens barrel 2. In step 104, the microcomputer 3 receives motion detection data from the lens barrel 2.

In step 105, the microcomputer 3 determines whether the detection of motion is possible based on the motion detection data received in step 104. If the detection of motion is possible, the operation proceeds to step 106. If the detection of motion is not possible, the operation returns to step 103.

In step 106, the microcomputer 3 transmits a motion compensation sequence initiation command to the lens barrel 2 to initiate a motion compensation sequence. In step 107, the microcomputer 3 waits for the full push switch 23 to be turned ON. In step 108, the microcomputer 3 go to a sub-routine for the shutter release sequence, which controls closing of the aperture 18, opening and closing of the shutter 19, etc.

Although the preferred embodiment of the present invention has been described with respect to a specific configuration, it will be recognized that the preferred embodiment is not limited to the specific configuration. For example, the present invention is described as being embodied in a single lens reflex camera, however one of ordinary skill in the art will recognize that the present invention is also applicable to compact cameras. Additionally, the present invention is described as using a motion compensation method wherein a motion compensation optical system is shifted on a plane perpendicular to the optical axis, however one of ordinary skill in the art will recognize that other methods may be used, such as a variable angle prism method, or a gimbal method.

According to the present invention, a determination is made as to whether motions, or motions, can be detected. If the detection of the motion is impossible, the camera body prohibits initiation of a motion compensation sequence or delays the initiation of the motion compensation sequence until the detection of the motion is possible. Consequently, as the motion compensation control begins after it has been verified that the detection of the motion is possible, adequate motion compensation control becomes possible, thereby achieving photography without errors due to faulty motion compensation sequence.

Although a few of the preferred embodiments have been shown and described, it would be appreciated by those skilled in the art that changes may be made in these embodiments without departing from the principles and spirit of the invention, the scope of which is defined in the claims and their equivalents. Further, one of ordinary skill in the art will recognize that while the preferred embodiments have been shown and described as being used within an optical camera, they may be adapted for use in any device in which it is desirable to suppress blurring of an image formed by an optical system, for example, in camcorders, motion picture cameras, telescopes, binoculars, microscopes, range finding equipment, lasers, fiber optic communication systems, various optical projection systems and CD mastering systems.

What is claimed is:

1. A motion compensation device for an optical system comprising:

a motion detection unit that detects motion which will cause image blur on an image produced by the optical system;

a compensation unit that compensates for the motion detected by said motion detection unit;

a motion compensation optical system that alters an optical axis of the optical system to compensate for the motion;

a motion compensation drive unit that drives said compensation unit based on the output from the motion detection unit;

a motion detection status determination unit that samples the peaks of a signal output by said motion detection unit and indicates that said motion detection unit is able to detect motion when said motion is outputting a stable signal; and a motion compensation initiation command unit that provides instructions to initiate a motion compensation sequence when said motion detection status determination unit indicates that said motion detection unit is able to detect the motion.

2. A motion compensation device, as set forth in claim 1, wherein the optical system is a photographic optical system.

3. A camera system comprising:

a lens barrel having;

a motion detection unit that detects motion;

a compensation unit that compensates for the image blur caused by the motion; and a motion compensation drive unit that drives said compensation unit based on the output from said motion detection unit;

a motion detection status determination unit that determines whether said motion detection unit is able to detect the motion;

a camera body attached to said lens barrel, said camera body adapted to communicate with said lens barrel; and a motion compensation initiation command unit that provides instructions to in initiate a motion compensation sequence when said motion detection status determination unit transmits a signal indicating that said motion detection unit is able to detect the motion.

4. A camera system, as set forth in claim 3, wherein the camera system is a single lens reflex camera.

5. A camera system, as set forth in claim 3, wherein the camera system is a compact camera.

6. A motion compensation device, as set forth in claim 3, wherein said motion detection status determination unit indicates that said motion detection unit is able to detect the motion when said motion detection unit is outputting a stable signal.

7. A motion compensation device, as set forth in claim 6, wherein said motion detection status determination unit samples the peaks of a signal output by said motion detection unit.

8. A camera system comprising:

a camera body having a motion detection unit that detects camera motion, a compensation unit that compensates for image blur caused by the camera motion, and a motion compensation drive unit that drives the compensation unit based on the output from the motion detection unit;

a lens barrel attached to said camera body having a motion detection status determination unit adapted to send a signal to said camera body indicating whether the motion detection unit is able to detect the motion; and said camera body having a motion compensation initiation command unit that instructs the initiation of a motion compensation sequence upon receiving a signal from said lens barrel indicating that the motion detection unit is able to detect the motion.

9. A camera system, as set forth in claim 8, wherein the camera system is a single lens reflex camera.

10. A camera system, as set forth in claim 8, wherein said lens barrel is detachably fixed to said camera body.

11. A camera system, as set forth in claim 8, wherein the camera system is a compact camera.

12. A camera system, as set forth in claim 8, wherein said lens barrel is integral with said camera body.

13. A lens barrel for use with a camera body, the lens barrel comprising:

a motion detection unit that detects motion generated by camera motion;

a compensation unit that compensates for image blur caused by the camera motion;

a motion compensation drive unit that drives the compensation unit based on the output from the motion detection unit; and a motion detection status determination unit that indicates to the camera body whether the motion unit is able to detect the motion.

14. A motion compensation device, as set forth in claim 13, wherein said motion detection status determination unit indicates that said motion detection unit is able to detect the motion when said motion detection unit is outputting a stable signal.

15. A motion compensation device, as set forth in claim 14, wherein said motion detection status determination unit samples the peaks of a signal output by said motion detection unit.

16. A motion compensation device, as set forth in claim 14, wherein said motion detection status determination unit equalizes the output of said motion detection unit for a predetermined period of time and indicates that said motion detection unit is able to detect the motion based on the changes in the mean values of the output of said motion detection unit.

* * * * *

UNITED STATES PATENT AND TRADEMARK OFFICE
CERTIFICATE OF CORRECTION

PATENT NO.   : 6,049,676
DATED        : April 11, 2000
INVENTOR(S)  : Kazuharu Imafuji, et al.

It is certified that error appears in the above-identified patent and that said Letters Patent is hereby corrected as shown below:

Column 8,
Line 51, (claim3), before "initiate" delete "in".

Signed and Sealed this

Third Day of July, 2001

Attest:

NICHOLAS P. GODICI
Attesting Officer   Acting Director of the United States Patent and Trademark Office